US012321297B2

(12) United States Patent
Chen et al.

(10) Patent No.: US 12,321,297 B2
(45) Date of Patent: Jun. 3, 2025

(54) BRIDGE DEVICE AND METHOD FOR TRANSFERRING COMMAND AND DATA BETWEEN A HOST DEVICE AND A DATA STORAGE DEVICE

(71) Applicant: Silicon Motion, Inc., Hsinchu County (TW)

(72) Inventors: Chen-Hao Chen, Kaohsiung (TW); Shih-Hsiang Shen, Taipei (TW); Hui-Lin Liu, Taoyuan (TW)

(73) Assignee: Silicon Motion, Inc., Hsinchu County (TW)

( * ) Notice: Subject to any disclaimer, the term of this patent is extended or adjusted under 35 U.S.C. 154(b) by 84 days.

(21) Appl. No.: 18/226,274

(22) Filed: Jul. 26, 2023

(65) Prior Publication Data
US 2024/0378162 A1 Nov. 14, 2024

(30) Foreign Application Priority Data
May 12, 2023 (TW) .................................. 112117768

(51) Int. Cl.
*G06F 13/40* (2006.01)
*G06F 13/16* (2006.01)
*G06F 13/38* (2006.01)

(52) U.S. Cl.
CPC ...... *G06F 13/4027* (2013.01); *G06F 13/1668* (2013.01); *G06F 13/382* (2013.01)

(58) Field of Classification Search
CPC . G06F 13/4027; G06F 13/1668; G06F 13/382
See application file for complete search history.

(56) References Cited

U.S. PATENT DOCUMENTS

| 8,713,357 B1* | 4/2014 | Jean ..................... | G06F 11/0769 714/6.1 |
| 2008/0320214 A1* | 12/2008 | Ma .......................... | G06F 3/064 711/E12.008 |
| 2009/0070516 A1* | 3/2009 | Hou ..................... | G06F 13/4027 711/100 |
| 2010/0122021 A1* | 5/2010 | Lee ....................... | G06F 3/0613 711/E12.001 |

(Continued)

FOREIGN PATENT DOCUMENTS

| TW | I343529 | 6/2011 |
| TW | 201235862 A1 | 9/2012 |

(Continued)

*Primary Examiner* — Nimesh G Patel
(74) *Attorney, Agent, or Firm* — Winston Hsu

(57) ABSTRACT

A bridge device for bridging a host device and a data storage device includes a first controller and a second controller. The first controller includes a first transmission interface. The second controller is coupled to the first controller and includes a second transmission interface. The second transmission interface is coupled to the first transmission interface through a bus. The first transmission interface operates in a slave mode and the second transmission interface operates in a master mode. The first transmission interface and the second transmission interface generate multiple transfer data chunks in compliance with a common bridge transfer format to perform transfer operations in dual directions for respectively transferring a command and data between a host device and a data storage device.

14 Claims, 13 Drawing Sheets

(56) References Cited

U.S. PATENT DOCUMENTS

| | | | | |
|---|---|---|---|---|
| 2010/0287424 A1* | 11/2010 | Kwon | ................... | G06F 9/4401 |
| | | | | 711/147 |
| 2011/0213921 A1* | 9/2011 | Yu | ....................... | G06F 12/0607 |
| | | | | 711/E12.008 |
| 2023/0410849 A1* | 12/2023 | Ootomo | ................ | G11C 16/26 |

FOREIGN PATENT DOCUMENTS

| TW | 201512846 A | 4/2015 |
|---|---|---|
| TW | 201915749 A | 4/2019 |
| TW | 202036301 A | 10/2020 |
| TW | 202119226 A | 5/2021 |
| TW | 202209104 A | 3/2022 |

* cited by examiner

BRIDGE DEVICE AND METHOD FOR TRANSFERRING COMMAND AND DATA BETWEEN A HOST DEVICE AND A DATA STORAGE DEVICE

BACKGROUND OF THE INVENTION

1. Field of the Invention

The invention relates to a method for transferring command and data between memory controllers, more particularly to a bridge device integrating multiple memory controllers to assist a host device to access a data storage device by transferring command and data between the memory controllers, as well as to make the bridge device backward compatible.

2. Description of the Prior Art

With the rapid growth of data storage technology in recent years, many data storage devices—such as memory cards manufactured in compliance with the Secure Digital (SD)/Multi Media Card (MMC) standards, Compact Flash (CF) standards, Memory Stick (MS) standards or Extreme Digital (XD) standards, as well as solid state hard drives (SSD), Embedded Multi Media Cards (eMMC) and Universal Flash Storage (UFS)—have been used widely for a variety of purposes.

Generally, a host device has to access a data storage device through a transmission interface that conforms to the corresponding standard of the data storage device. If the host device itself does not have a transmission interface that can support the standard of the data storage device, the data storage device should be accessed through a specific bridge device. In order to achieve better performance as well as to save the manufacturing costs, data storage devices are usually developed by using the latest process or the latest standard along with the evolution of the process and/or the evolution of the corresponding standard of the transmission interface. However, there may be no bridge device that can support the latest process or the latest standard at the same time while the data storage devices are manufacturing, resulting in a problem that the host device cannot access and/or authenticate the newly developed data storage device through the existing bridge device.

To solve this problem, a bridge device capable of integrating high-speed transmission interfaces made by different processes or in compliance with different standards is required, so as to assist a host device to access a data storage device and to make the bridge device backward compatible.

SUMMARY OF THE INVENTION

According to an embodiment of the invention, a bridge device for bridging a host device and a data storage device comprises a first controller comprising a first transmission interface and a second controller coupled to the first controller and comprising a second transmission interface coupled to the first transmission interface through a bus. The first transmission interface operates in a slave mode and the second transmission interface operates in a master mode. The first transmission interface and the second transmission interface generate a plurality of transfer data chunks in compliance with a common bridge transfer format to perform transfer operations in dual directions for respectively transferring a command and data between the host device and the data storage device.

According to an embodiment of the invention, a method for transferring commands and data between a host device and a data storage device to perform transfer operations in dual directions comprising: transferring a plurality of transfer data chunks generated in compliance with a common bridge transfer format between a first transmission interface and a second transmission interface, wherein the first transmission interface is a transmission interface of a first memory controller, the second transmission interface is a transmission interface of a second memory controller, the first transmission interface operates in a slave mode and the second transmission interface operates in a master mode. Step of transferring the plurality of transfer data chunks generated in compliance with the common bridge transfer format between the first transmission interface and the second transmission interface further comprises: receiving, by the first transmission interface, a first transfer data chunk from the second transmission interface, wherein a data portion of the first transfer data chunk comprises a plurality of command packets and one of the plurality of command packets is a combination of a first bridge command and a first memory command; parsing, by the first transmission interface, the first bridge command to obtain a first memory command; and providing, by the first transmission interface, the first memory command to the data storage device.

These and other objectives of the present invention will no doubt become obvious to those of ordinary skill in the art after reading the following detailed description of the preferred embodiment that is illustrated in the various figures and drawings.

DETAILED DESCRIPTION

In the following, numerous specific details are described to provide a thorough understanding of embodiments of the invention. However, one of skilled in the art will understand how to implement the invention in the absence of one or more specific details, or relying on other methods, elements or materials. In other instances, well-known structures, materials or operations are not shown or described in detail in order to avoid obscuring the main concepts of the invention.

Reference throughout this specification to "one embodiment", "an embodiment", "one example" or "an example" means that a particular feature, structure or characteristic described in connection with the embodiment or example is included in at least one embodiment of a plurality of embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

In addition, in order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof.

Figure 1:
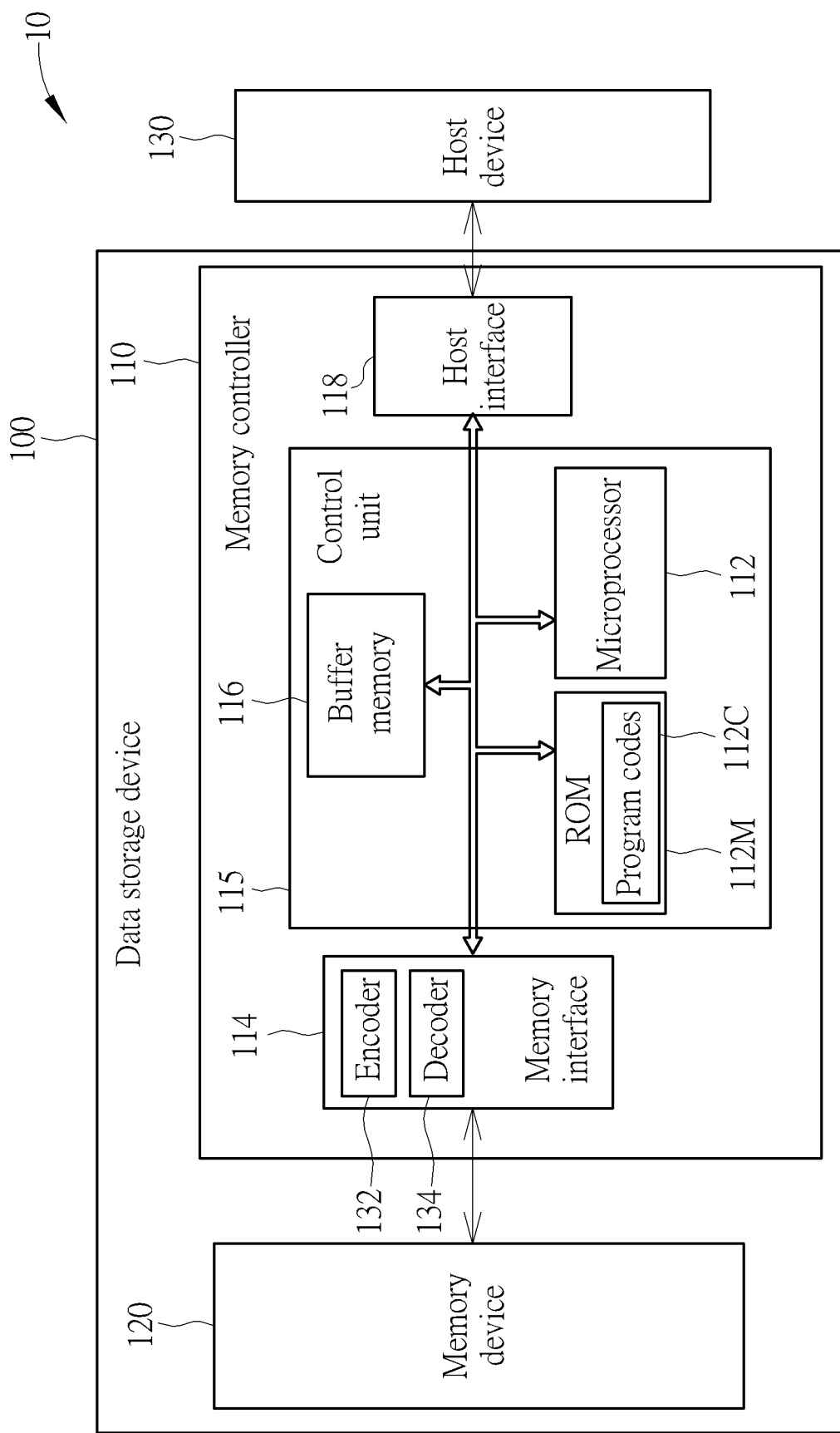
FIG. 1 is an exemplary block diagram of a data storage device according to an embodiment of the invention.

FIG. 1 is an exemplary block diagram of a data storage device according to an embodiment of the invention. The data storage device 100 may comprise a memory device 120 and a memory controller 110. The memory controller 110 is configured to access the memory device 120 and control operations of the memory device 120. The memory device 120 may be a non-volatile (NV) memory (e.g., a Flash memory) device and may comprise one or more memory elements (e.g., one or more Flash memory dies, or one or more Flash memory chip, or the likes).

The data storage device 100 may be coupled to a host device 130. The host device 130 may comprise at least one processor, a power supply circuit, and at least one random access memory (RAM), such as at least one dynamic RAM (DRAM), at least one static RAM (SRAM), . . . etc. (not shown in FIG. 1). The processor and the RAM may be coupled to each other through a bus, and may be coupled to the power supply circuit to obtain power. The processor may be arranged to control operations of the host device 130, and the power supply circuit may be arranged to provide the processor, the RAM, and the data storage device 100 with power. For example, the power supply circuit may output one or more driving voltages to the data storage device 100. The data storage device 100 may obtain the one or more driving voltages from the host device 130 as the power of the data storage device 100 and provide the host device 130 with storage space.

According to an embodiment of the invention, the memory controller 110 may comprise a microprocessor 112, a Read Only Memory (ROM) 112M, a memory interface 114, a buffer memory 116 and a host interface 118. The microprocessor 112, the ROM 112M and the buffer memory 116 may form a control unit 115 of the memory controller 110. The ROM 112M is configured to store program codes 112C. The microprocessor 112 is configured to execute the program codes 112C, thereby controlling access to the memory device 120. The program codes 112C may comprise one or more program modules, such as the boot loader code. When the data storage device 100 obtains power from the host device 130, the microprocessor 112 may perform an initialization procedure of the data storage device 100 by executing the program codes 112C. In the initialization procedure, the microprocessor 112 may load a group of In-System Programming (ISP) codes (not shown in FIG. 1) from the memory device 120. The microprocessor 112 may execute the group of ISP codes, so that the data storage device 100 has various functions. According to an embodiment of the invention, the group of ISP codes may comprise, but are not limited to: one or more program modules related to memory access (e.g., read, write and erase), such as a read operation module, a table lookup module, a wear leveling module, a read refresh module, a read reclaim module, a garbage collection module, a sudden power off recovery (SPOR) module and an uncorrectable error correction code (UECC) module, respectively provided for performing the operations of read, table lookup, wear leveling, read refresh, read reclaim, garbage collection, SPOR and error handling for detected UECC error.

The memory interface 114 may comprise an encoder 132 and a decoder 134. The encoder 132 is configured to encode the data to be written into the memory device 120, such as performing ECC encoding. The decoder 134 is configured to decode the data read out from the memory device 120.

Typically, the memory device 120 may comprise a plurality of memory elements, such as a plurality of Flash memory dies or Flash memory chips, and each memory element may comprise a plurality of memory blocks. The access unit of an erase operation performed by the memory controller 110 on the memory device 120 may be one memory block. In addition, a memory block may record (comprise) a predetermined number of pages, for example, the physical pages, and the access unit of a write operation performed by the memory controller 110 on the memory device 120 may be one page.

In practice, the memory controller 110 may perform various control operations by using its own internal components. For example, the memory controller 110 may use the memory interface 114 to control the access operations (especially the access operation for at least a memory block or at least a page) of the memory device 120, use the buffer memory 116 to perform necessary data buffer operations, and use the host interface 118 to communicate with the host device 130.

In an embodiment of the invention, the memory controller 110 may use the host interface 118 to communicate with the host device 130 in compliance with a standard communication protocol. For example, the standard communication protocol may comprise (but is not limited to) the Universal Serial Bus (USB) standard, the SD interface standard, the Ultra High Speed-I (UHS-I) interface standard, the Ultra High Speed-II (UHS-II) interface standard, the CF interface standard, the Multi Media Card (MMC) interface standard, the eMMC interface standard, the UFS interface standard, the Advanced Technology Attachment (ATA) standard, the Serial ATA (SATA) standard, the Peripheral Component Interconnect Express (PCI-E) standard, the Parallel Advanced Technology Attachment (PATA) standard, etc.

In an embodiment, the buffer memory 116 may be implemented by a RAM. For example, the buffer memory 116 may be an SRAM, but the invention should not be limited thereto. In other embodiments, the buffer memory 116 may be a DRAM.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the UFS or the eMMC standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

Figure 2:
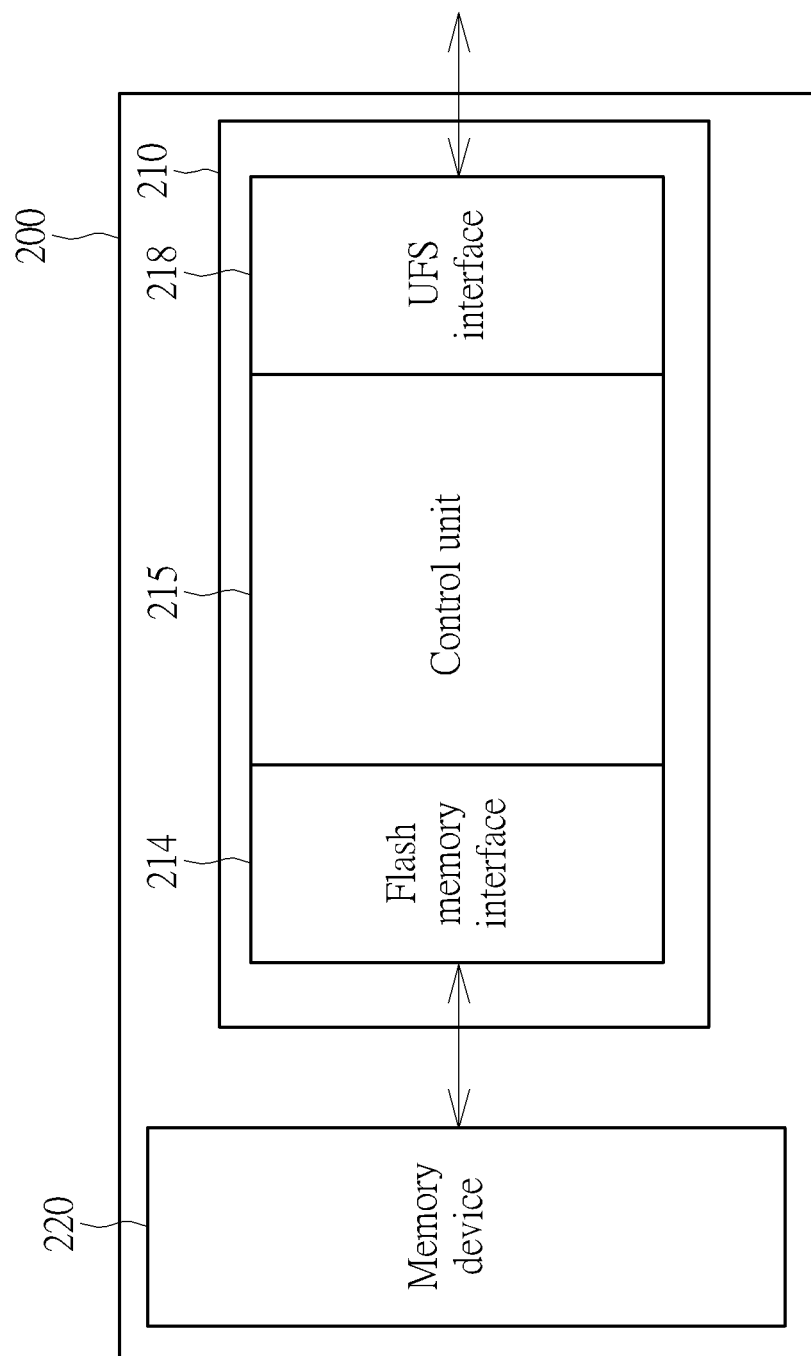
FIG. 2 is a simplified block diagram of a data storage device according to an embodiment of the invention.

FIG. 2 is a simplified block diagram of a data storage device according to an embodiment of the invention, wherein the components inside the memory controller are simplified into three parts: the host interface, the memory interface and the control unit, so as to simplify the description in the following paragraphs. As shown in FIG. 2, the data storage device 200 may comprise a memory device 220 and a memory controller 210. The memory controller 210 may access the memory device 220 and control operations of the memory device 220. The memory controller may be a non-volatile (NV) memory device, such as the above-mentioned flash memory.

In an embodiment of the invention, the memory device 220 may be a NAND type flash memory and the data storage device 200 may be implemented as an UFS device. Therefore, in this embodiment, the memory controller 210 may comprise an UFS interface 218, a flash memory interface 214 and a control unit 215. The UFS interface 218 may be the aforementioned host interface and the flash memory interface 214 may be the aforementioned memory interface. The control unit 215 may comprise a microprocessor, a ROM, a buffer memory as shown in FIG. 1. The control unit 215 may communicate with a host device (not shown in FIG. 2) through the UFS interface 218 and in compliance with the UFS protocol, and the control unit 215 may access the memory device 220 through the flash memory interface 214.

As discussed above, when a host device is equipped with a transmission interface supporting the corresponding standard of the data storage device 100/200, the host device may directly access the data storage device 100/200 through the transmission interface. When the host device is not equipped with any transmission interface supporting the corresponding standard of the data storage device 100/200, the data storage device 100/200 must be accessed through a specific bridge device.

However, when the data storage devices 100/200 are developed by using the latest process or the latest standard along with the evolution of the process or corresponding standard of the transmission interface, there may be no bridge device that can support the latest process or the latest standard at the same time while the data storage devices are manufacturing, or the bridge device may not be able to simultaneously comprise different high-speed transmission interfaces that are made by different processes or standards, resulting in the problem that the host device cannot access and/or authenticate the newly developed data storage device through the existing bridge device. In addition, when the host device is equipped with the transmission interface supporting the latest standard, the host device may be still unable to access the device that is not equipped with any transmission interface supporting the latest standard. As an example, according to the definition in the UFS standards, the versions of UFS 3.1 and UFS 3.0 are not compatible with each other because they respectively define the descriptor with different lengths. If a host device is a host platform adopting the UFS 3.1 standard, the corresponding device must use the firmware in compliance with the UFS 3.1 standard, otherwise there will be differences in compatibility, which will cause the host device unable to operate the device correctly, and vice versa.

To solve this problem, a bridge device capable of integrating or combining high-speed transmission interfaces made by different processes or in compliance with different standards is proposed, so as to assist a host device to access a data storage device and to make the bridge device backward compatible. In addition, a method for transferring command and data between the transmission interfaces inside of the bridge device, to assist the host device to access the data storage device by transferring the command and data between the memory controllers integrated inside of the bridge device, is also proposed.

Figure 3:
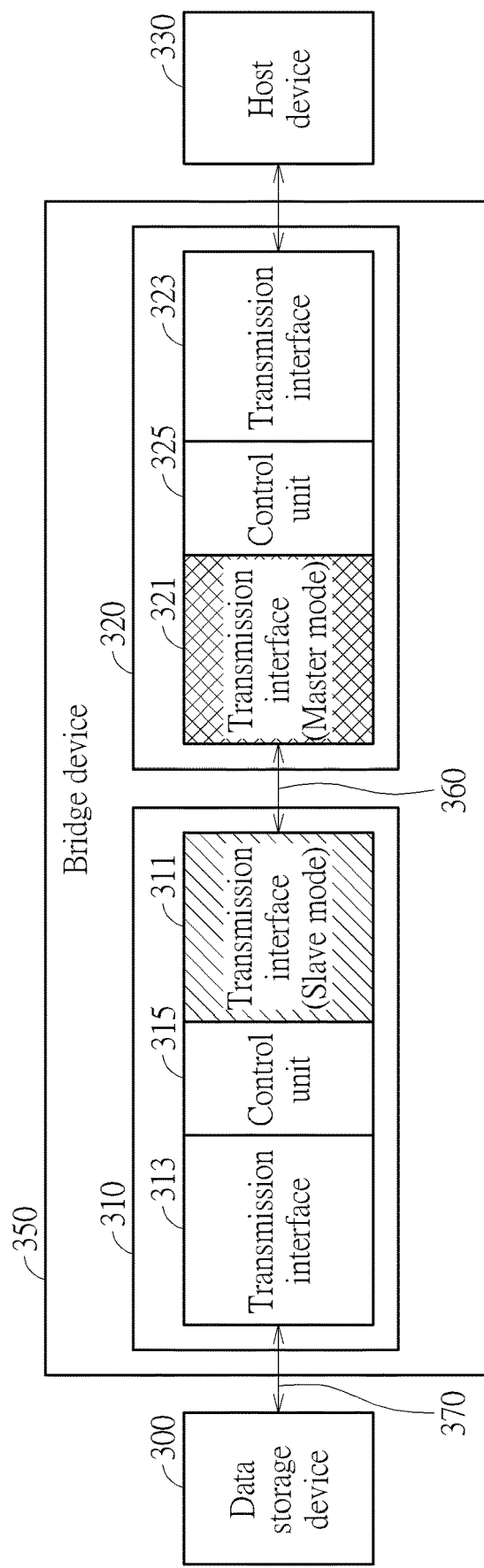
FIG. 3 is an exemplary block diagram of a data storage system according to an embodiment of the invention.

FIG. 3 is an exemplary block diagram of a data storage system according to an embodiment of the invention. The data storage system may at least comprise a data storage device 300 and a bridge device 350. The bridge device 350 may be coupled between the data storage device 300 and the host device 330 for transferring commands, data and signals therebetween to perform and/or implement the transfer operations in dual directions, thereby assisting the host device 330 to access the data storage device 300.

According to an embodiment of the invention, the bridge device 350 may comprise controllers 310 and 320. The controller 310 may comprise transmission interfaces 311 and 313 and a control unit 315. The controller 320 may comprise transmission interfaces 321 and 323 and a control unit 325. The transmission interfaces 311, 313, 321 and 323 may be respectively configured to communicate with a device or a transmission interface coupled thereto in compliance with a corresponding standard communication protocol. The transmission interface 311 is coupled to the transmission interface 321 for the controller 310 and 320 to communicate with each other through the transmission interfaces 311 and 321. The transmission interface 323 is configured to communicate with the host device 330 and the transmission interface 313 is configured to communicate with the data storage device 300. The control units 315 and 325 may be configured to execute built-in program codes, thereby making the controllers 310 and 320 have corresponding functions, and the control units 315 and 325 may be respectively configured to control transmissions and receptions of the signals and packets between the two transmission interfaces 311 and 313 and between the two transmission interfaces 321 and 323, process the received signals and packets and process the signals and packets to be transmitted in compliance with the corresponding standard communication protocol, and may be further configured to perform and control format conversion of the signals and the packets, so that the signals and packets are transmitted in a correct data format through the corresponding transmission interfaces.

The bridge device 350 may further comprise a bus 360. The bus 360 is coupled between the controllers 310 and 320 for connecting the transmission interfaces 311 and 321 and making the controllers 310 and 320 to connect and communicate with each other through the transmission interfaces 311 and 321 and transmit signals and packets through the bus 360. For example, transmitting control signals, command signals and data packets. In the embodiments of the invention, the transmission interfaces 311 and 321 may generate a plurality of transfer data chunks in compliance with a common bridge transfer format, where a transfer data chunk carries one or more commands and/or data to be transferred between the host device 330 and the data storage device 300, comprising the aforementioned control signals, command signals and data packets, or the likes.

According to an embodiment of the invention, the transmission interfaces 311 and 321 may be flash memory interfaces. As an example, the transmission interfaces 311 and 321 may both be a NAND flash memory interface (or named as NAND flash controller (NFC)). In addition, according to an embodiment of the invention, the controller 310 and 320 may both be a memory controller, such as the proposed memory controller 110 or 210 as discussed above. In an embodiment of the invention, the control units 315 and 325 may be implemented as the control unit 115. That is, the control units 315 and 325 may respectively comprise a microprocessor, a ROM, a buffer memory as shown in FIG. 1, for performing corresponding signal processing between the two transmission interfaces 311 and 313 and between the two transmission interfaces 321 and 323 in compliance with the corresponding standard communication protocol.

According to an embodiment of the invention, the transmission interface 323 may be a Peripheral Component Interconnect Express (PCIe) interface or a Universal Serial Bus (USB) interface. The controller 320 may communicate with the host device 330 through the transmission interface 323 in compliance with the corresponding PCIe or the USB protocol. In addition, according to an embodiment of the invention, when the data storage device 300 is implemented as a UFS device, the transmission interface 313 may be a UFS interface and the controller 310 may communicate with the data storage device 300 through the transmission interface 313 in compliance with the corresponding UFS protocol, so as to access the data storage device 300. It is to be noted that, the invention is not limited to be implemented by only the aforementioned PCIe interface, USB interface or UFS interface.

In an embodiment of the invention, the data storage device 300 may be implemented as the data storage device 100 or 200. That is, the data storage device 300 may comprise a memory device and a memory controller as shown in FIG. 1 and FIG. 2, wherein the memory controller comprised in the data storage device 300 may be coupled to the controller 310 of the bridge device 350. For example, the memory controller of the data storage device 300 may be coupled to the memory controller 310 through the corresponding bus 370.

To be more specific, when the data storage device 300 is implemented as a UFS device, the host interface or the UFS interface comprised in the memory controller of the data storage device 300 may be coupled to the transmission interface 313 of the memory controller 310 through the corresponding bus 370, and in this embodiment, the transmission interface 313 may also be a UFS interface to make the controller 310 to communicate with the memory controller of the data storage device 300 through the corresponding UFS interface.

Therefore, according to an embodiment of the invention, the data storage system may comprise at least three controllers, including the controllers 310 and 320 (hereinafter also referred to as the first controller and the second controller) disposed in the bridge device 350 and the memory controller (also referred to as a third controller hereinafter) disposed in the data storage device 300. In the embodiment of the invention, the first controller, the second controller and the third controller are all memory controllers. In addition, according to an embodiment of the invention, the first controller and the third controller may be selected as the same memory controller. For example, the first controller and the third controller may be the same type of controller chip (e.g., the controller chips having the same product number or serial number), or the first controller and the third controller may be identical (that is, having the same hardware, software and/or firmware design), or the first controller and the third controller may both be a UFS memory controller, but they may be the same or different types of UFS memory controller (e.g., the UFS memory controller chips having the same product number or serial number or having different product numbers or serial numbers) and the second controller may be an SSD memory controller. Note that when the first controller and the third controller are different types of UFS memory controller (e.g., having different product numbers or serial numbers), the UFS standards which the first controller and the third controller operate in compliance with are compatible with each other. In other words, in some embodiments of the invention, the bridge device 350 may be equipped with the same memory controller as the data storage device 300, wherein the host interfaces of the two memory controllers (or, when the data storage device 300 is implemented as a UFS device, they may be UFS interfaces) may be connected to each other through corresponding bus, so that the first controller in the bridge device 350 and the third controller in the data storage device 300 may communicate with each other through these two interfaces.

In addition, the transmission interface 311 of the controller 310 and the transmission interface 321 of the controller 320 inside the bridge device 350 may both be the aforementioned memory interface and may be connected to each other through the corresponding bus 360, and the bus 360 may be a bus for communicating with the memory device, such as a NAND bus.

It should be noted that the aforementioned implementations are only a portion of a variety of implementations to implement the invention, and the invention should not be limited thereto. In other embodiments of the invention, the first controller and the third controller may also be selected as different memory controllers.

According to an embodiment of the invention, the first controller may be configured to operate in a host mode, and the third controller may be configured to operate in a device mode. Thus, in embodiments where the first controller and the third controller are both memory controllers or the first controller and the third controller are the same memory controller, the first controller is the one that operates in the host mode, and the third controller is the one that operates in the device mode.

According to an embodiment of the invention, the memory controllers may be equipped with hardware devices and corresponding firmware and software structures for performing host mode operations, and may be also equipped with hardware devices and corresponding firmware and software structures for performing device mode operations. In this manner, in the embodiments of the invention, by properly configuring the corresponding operation mode, the same memory controller may be used in both the bridge device and the data storage device at the same time.

According to an embodiment of the invention, the memory controller may be configured to operate in the device mode or the host mode by means of software or hardware. For example, the memory controller may comprise a register for storing the setting value regarding the operation mode. By executing the corresponding software program codes, such as the aforementioned ISP code, the control unit of the memory controller may set the setting value stored in the register. When the setting value stored by the register is set to a first setting value, the control unit may operate in a host mode, thereby configuring the memory controller to operate in the host mode. When the setting value stored by the register is set as a second setting value, the control unit may operate in a device mode, thereby configuring the memory controller to operate in the device mode. For another example, the memory controller may comprise a setting pin, for example, a general-purpose input/output (GPIO) pin, and the memory controller may determine which mode to operate in according to a value of the setting pin. When the setting pin is set to a first setting value, the control unit may operate in a host mode, thereby configuring the memory controller to operate in the host mode. When the setting pin is set to a second setting value or is not set, the control unit may operate in a device mode, thereby configuring the memory controller to operate in the device mode.

According to an embodiment of the invention, when the memory controller and/or the control unit thereof is configured to operate in host mode, the transmission interface thereof, such as the aforementioned flash memory interface, operates in a slave mode, and when the memory controller and/or the control unit thereof is configured to operate in device mode, transmission interface thereof operates in a master mode.

Continuing the previous embodiment, in an embodiment of the invention, the second controller may be configured to operate in the device mode, the first controller may be configured to operate in the host mode, and the third controller may be configured to operate in the device mode. Under such configuration, the transmission interface 321 may operate in the master mode, the transmission interface 311 may operate in the slave mode, and the transmission interface (e.g., the aforementioned memory interface 114 or flash memory interface 214) configured inside the memory controller (the third controller) of the data storage device may operate in the master mode.

According to an embodiment of the invention, when the memory controller operates in the host mode, the control unit of the memory controller may be a Host Controller Interface (HCI) for mastering the overall communication protocol of the memory controller. For example, when the memory controller operates in the host mode, the control unit of the memory controller may actively set the corresponding register, and the hardware devices in the memory controller for performing the operation in the host mode and the corresponding firmware and software structure may operate according to the setting value of the register, so that the data to be transmitted through each transmission interface will have the format that conforms to the corresponding communication protocol. In this manner, each transmission interface may directly transmit signals and packets having the correct data format, and may correctly interpret the content of the received signals and packets as well. When the memory controller operates in the device mode, the hardware devices in the memory controller for performing the operation in the device mode and the corresponding firmware and software structure may be configured to perform the corresponding communication protocol. As an example, the control unit and the associated components may receive and process signals and packets in compliance with the corresponding standard communication protocol.

Figure 4:
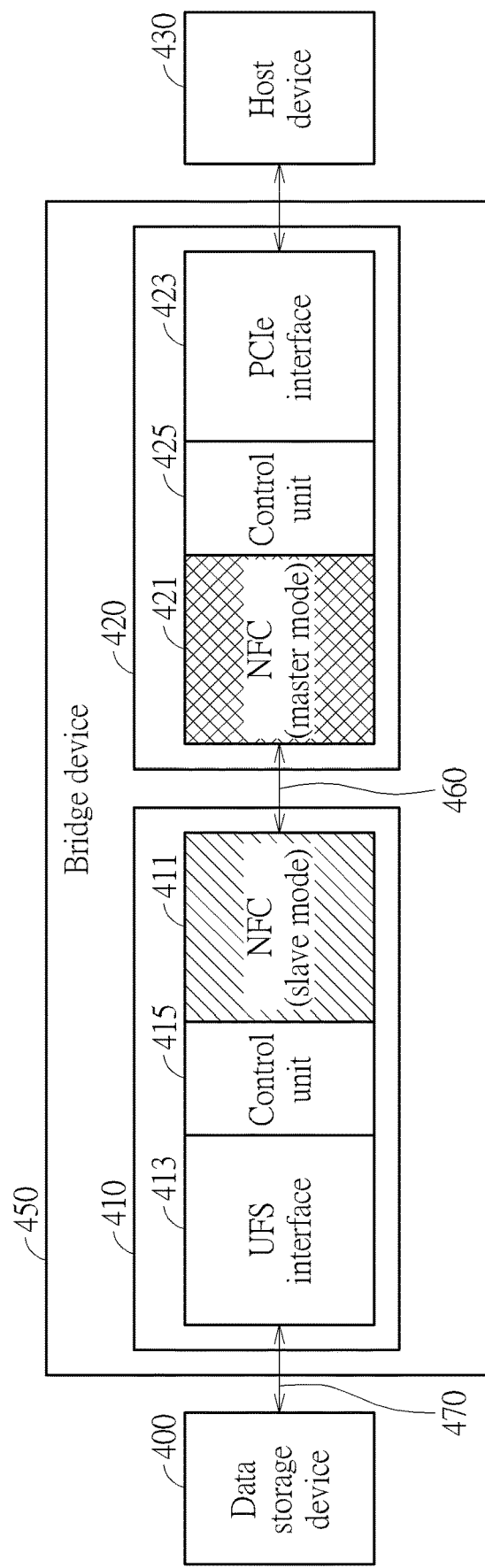
FIG. 4 is a schematic diagram showing an implementation of the data storage system according to an embodiment of the invention.

FIG. 4 is a schematic diagram showing an implementation of the data storage system according to an embodiment of the invention. The data storage system may at least comprise a data storage device 400 and a bridge device 450. The bridge device 450 may be coupled between the data storage device 400 and the host device 430 for transferring commands, data and signals therebetween to perform and/or implement transfer operations in dual directions, thereby assisting the host device 430 to access the data storage device 400.

The bridge device 450 may comprise controllers 410 and 420. In this embodiment, the controller 410 may be a UFS memory controller and the controller 420 may be a SSD memory controller, and the data storage device 400 may be a UFS device. The controller 420 may comprise a flash memory interface (such as the NAND flash controller (NFC) shown in FIG. 4) 421 operating in a master mode, a PCIe interface 423, and a control unit 425. The controller 410 may comprise flash memory interface, such as the NFC 411 shown in FIG. 4, operating in slave mode, a UFS interface 413, and a control unit 415. The data storage device 400 may comprise a UFS memory controller and a memory device as described above.

The NFC 411 and the NFC 421 may be coupled to each other through the bus 460, the UFS interface 413 and the UFS interface of the UFS memory controller in the data storage device 400 may be coupled to each other through the bus 470, and the controller 420 may communicate with the host device 430 through the PCIe interface 423.

In this embodiment, the controller 420 may be configured to operate in the device mode, the controller 410 may be configured to operate in the host mode, and the UFS memory controller in the data storage device 400 may be configured to operate in the device mode.

It is to be noted that the interfaces of specific standards shown in FIG. 4, such as the UFS interface, NFC and PCIe interface, etc., are only some of the various implementations applicable to the invention, and the invention is certainly not limited to only these specific standards.

In addition, it is to be noted that, the first controller and the second controller comprised in the bridge device (such as the bridge device 350 or 450) may be the memory controllers which were originally designed to be connected to a corresponding memory device, such as the exemplary connection between the memory controller and the memory device shown in FIG. 1 and FIG. 2. However, in the embodiments of the invention, instead of directly connecting the controller to a memory device (such as a NAND flash memory), the memory interfaces, which were originally configured to be connected to the memory interface of the corresponding memory device, in the first controller and the second controller may be connected to each other symmetrically through the corresponding bus, such as the NAND bus. Based on this architecture and the corresponding operation mode settings (such as the aforementioned master mode and slave mode), dual-direction data, signals and command transfers between the data storage device and the host device are achieved.

Figure 5:
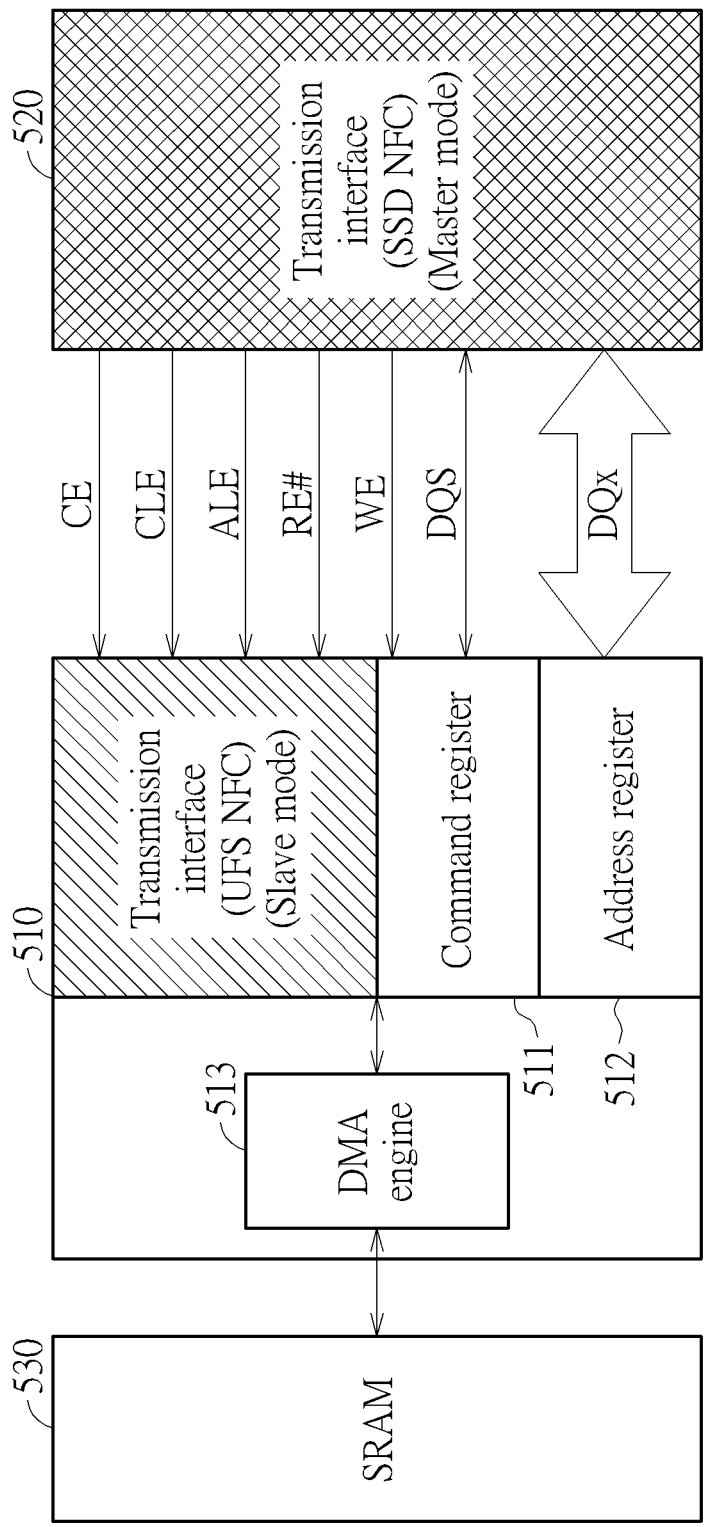
FIG. 5 is a schematic diagram showing control signals and data transmitted through a bus between two transmission interfaces connected to each other according to an embodiment of the invention.

FIG. 5 is a schematic diagram showing control signals and data transmitted through a bus between two transmission interfaces connected to each other according to an embodiment of the invention. In this example, the transmission interface 510 may be a flash memory interface, such as the UFS NFC shown in FIG. 5, operating in a slave mode. Since the transmission interface 510 is acted as a receiving party of memory access commands, the transmission interface 510 may comprise at least a command register 511, an address register 512 and a Direct Memory Access (DMA) engine 513. In addition, the transmission interface 510 may further be further coupled to or comprise a SRAM 530. On the other hand, the transmission interface 520 may be a flash memory interface, such as the SSD NFC shown in FIG. 5, operating in a master mode.

Figure 6:
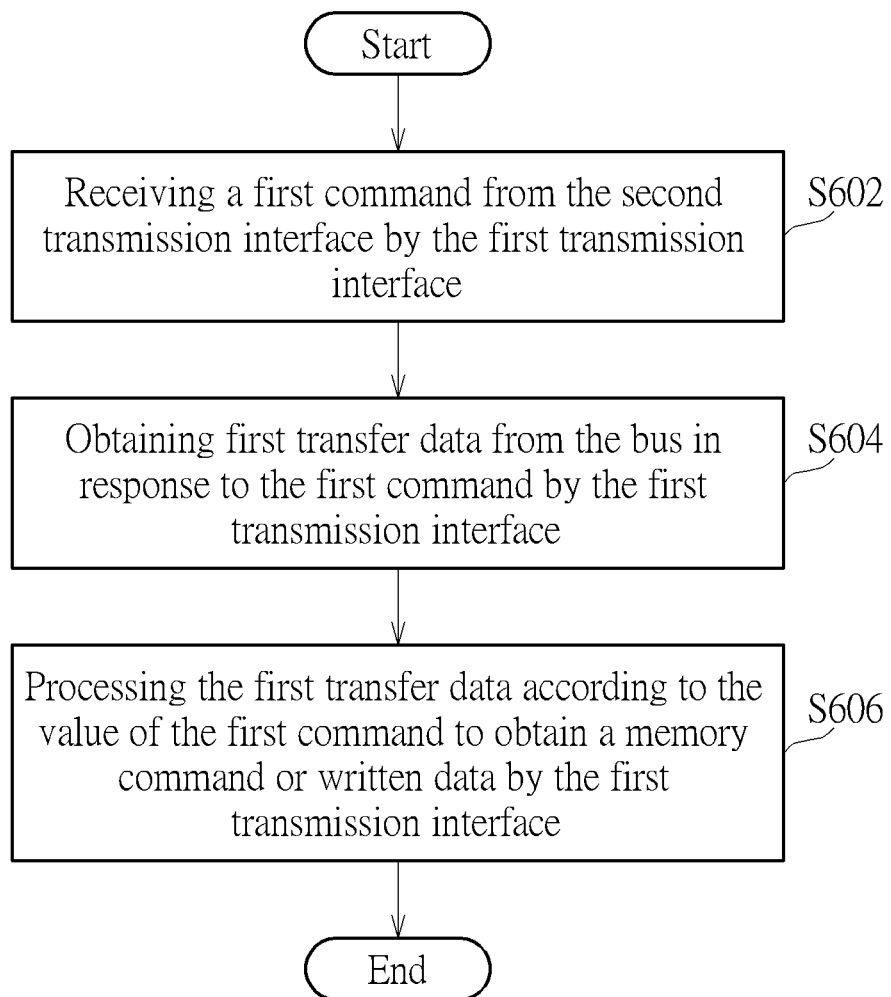
FIG. 6 shows an exemplary flow chart of a method for transferring commands and data between two transmission interfaces belonging to different controllers according to an embodiment of the invention.

FIG. 6 shows an exemplary flow chart of a method for transferring commands and data between two transmission interfaces belonging to different controllers according to an embodiment of the invention. According to an embodiment of the invention, since the bridge device is configured to assist a host device to access a data storage device, the operation of the bridge device in a program mode is illustrated first in the exemplary flow chart. The program mode here refers to the mode configured to perform the memory command transfer operation in a first direction and the memory data transfer operation in the first direction.

According to an embodiment of the invention, the aforementioned first direction is a direction from the transmission interface operating in the master mode (or, from the memory controller comprised in the bridge device and comprising the transmission interface operating in the master mode) to the transmission interface operating in the slave mode (or, to the memory controller comprised in the bridge device and comprising the transmission interface operating in the slave mode). As an example, the first direction may be the direction from the transmission interface 321 to the transmission interface 311 as shown in FIG. 3, the direction from the NFC 421 to the NFC 411 as shown in FIG. 4 or the direction from the transmission interface 520 to the transmission interface 510 as shown in FIG. 5. On the contrary, the second direction is a direction from the transmission interface operating in the slave mode (or, from the memory controller comprised in the bridge device and comprising the transmission interface operating in the slave mode) to the transmission interface operating in the master mode (or, to the memory controller comprised in the bridge device and comprising the transmission interface operating in the master mode). As an example, the second direction may be the direction from the transmission interface 311 to the transmission interface 321 as shown in FIG. 3, the direction from the NFC 411 to the NFC 421 as shown in FIG. 4 or the direction from the transmission interface 510 to the transmission interface 520 as shown in FIG. 5.

The proposed method for transferring commands and data between memory controllers may comprise the following steps:

Step S602: receiving, by a first transmission interface, a first command from a second transmission interface. As described above, the first transmission interface may be a memory interface of a first memory controller and the second transmission interface may be a memory interface of a second memory controller. For the first memory controller, the second memory controller is a peer memory controller. In addition, according to an embodiment of the invention, a value of the first command is optionally set to a first value or a second value, the first value indicates a memory command transfer operation in a first direction and the second value indicates a memory data transfer operation in the first direction. That is, whether the following transfer operation is a memory command transfer operation or a memory data transfer operation may be distinguished by the setting of the value of the aforementioned command.

Step S604: obtaining, by the first transmission interface, first transfer data from the bus in response to the first command. As described above, the first transfer data may be the memory access command or data provided by the peer memory controller or the host device, and the first transfer data is provided to the bus by the peer memory controller.

Step S606: processing, by the first transmission interface, the first transfer data according to the value of the first command to obtain a memory command or written data.

Referring back to FIG. 5, a plurality of control signals may be transmitted between the transmission interfaces 510 and 520 via the corresponding bus. For example, the control signals may comprise the chip enable signal CE to enable a target device, such as one or more flash memory dies, the command latch signal CLE to instruct a command latch operation, the address latch signal (ALE) to instruct an address latch operation, the read enable signal RE # to instruct a read operation, a write enable signal WE to instruct a write operation, a data strobe signal DQS provided as a reference for sampling the data transmitted in serial and the data input/output signal DQx provided for transmissions of commands, addresses and data in dual-direction.

According to an embodiment of the invention, in the program mode, the transmission interface 520 may issue the command latch signal CLE and the address latch signal ALE. In response to the command latch signal CLE, the transmission interface 510 loads a command (for example, the aforementioned first command) in the command register 511. In response to the address latch signal ALE, the transmission interface 510 loads an address signal in the address register 512. Since the command corresponding to the program mode is a write command, the transmission interface 510 obtains transfer data from the bus in response to the first command.

Similarly, in the read mode, the transmission interface 520 may issue the command latch signal CLE and the address latch signal ALE. In response to the command latch signal CLE, the transmission interface 510 loads a command (for example, a second command or a read command) in the command register 511. In response to the address latch signal ALE, the transmission interface 510 loads an address signal in the address register 512. Then, the transmission interface 510 transmits the transfer data to the bus in response to the second command. Here, the transfer data may be a response command provided by the host device or read data that was read from the memory device of the data storage device. Similarly, the value of the second command is optionally set to a third value or a fourth value, the third value indicates a memory command transfer operation in a second direction and the fourth value indicates a memory data transfer operation in the second direction.

In the embodiments of the invention, the memory command may be the access command provided through the transmission interface 520 to the data storage device for accessing a memory device of the data storage device, or a response command provided through the transmission interface 510 to the host device for responding to the access operation (e.g., reporting an access result). The memory data may be the written data provided to the data storage device through the transmission interface 520 for being written into the memory device or the read data read from the memory device and provided to the host device through the transmission interface 510.

Figure 7A:
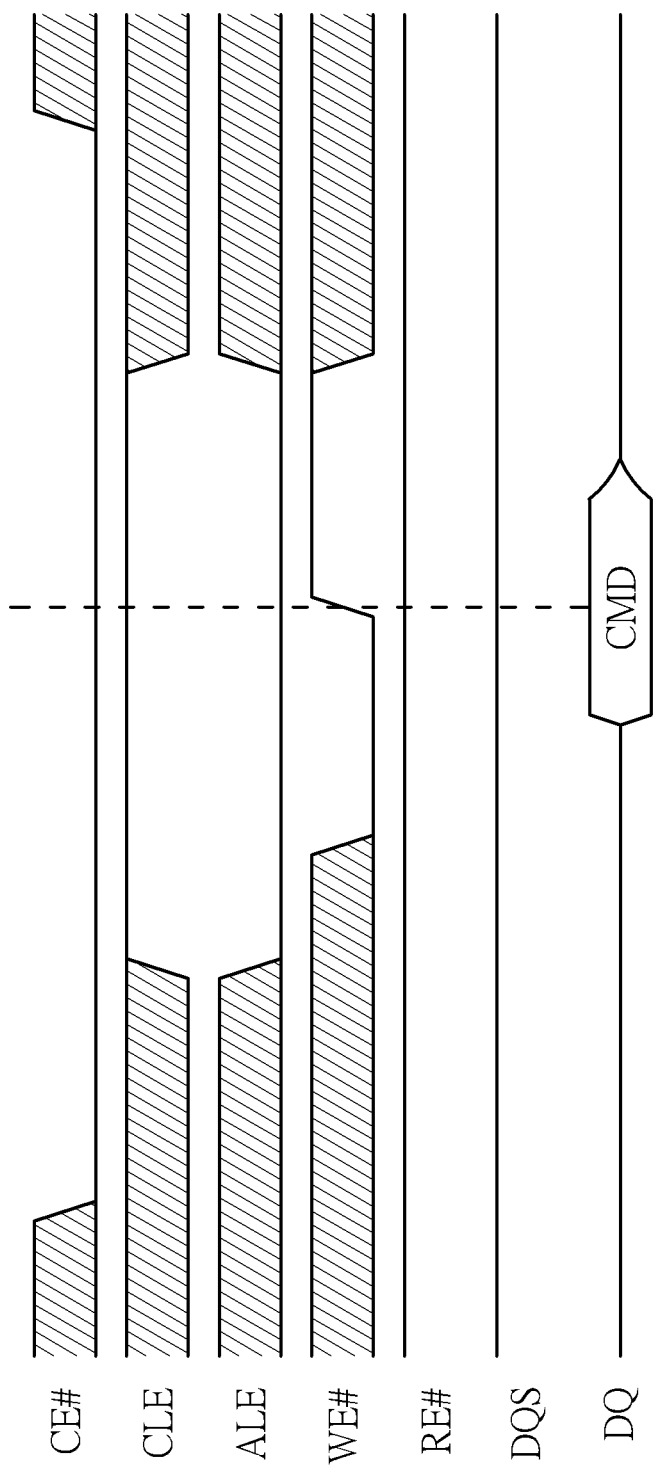
FIG. 7A shows the signal waveforms on the bus in a command cycle according to an embodiment of the invention.
Figure 7B:
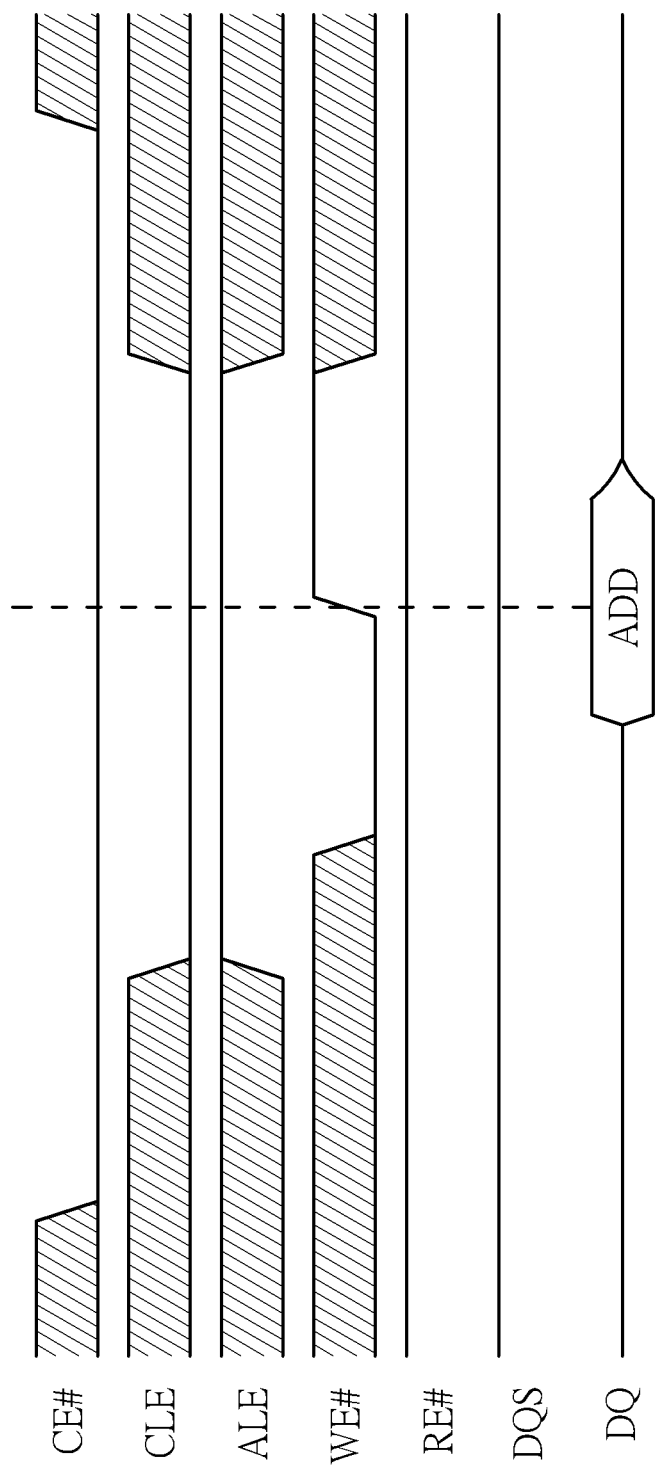
FIG. 7B shows the signal waveforms on the bus in an address cycle according to an embodiment of the invention.
Figure 8A:
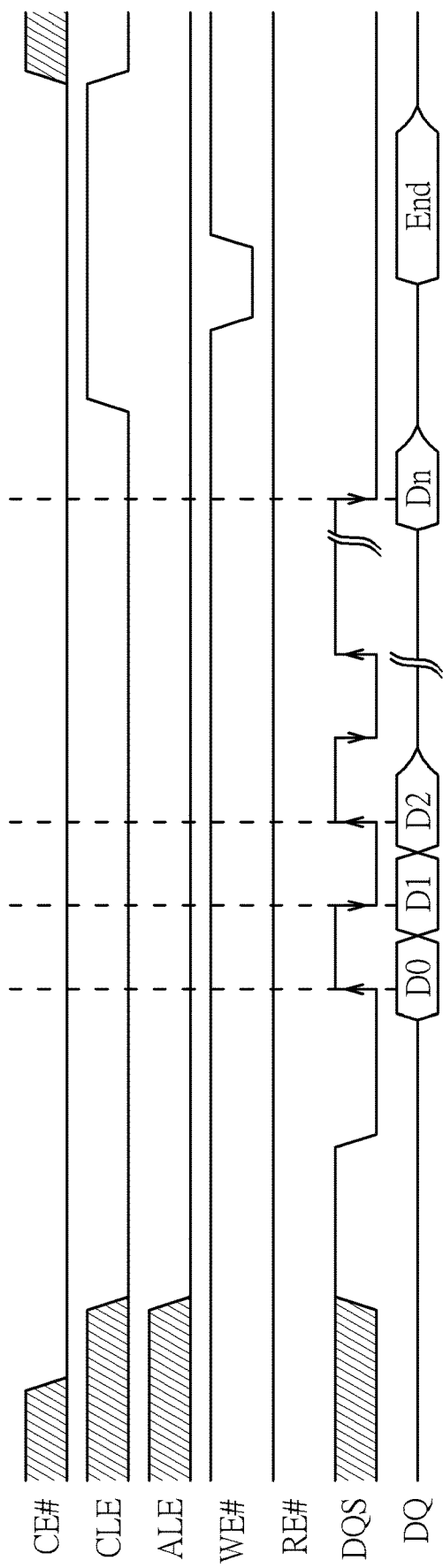
FIG. 8A shows the signal waveforms on the bus in a data input cycle according to an embodiment of the invention.
Figure 8B:
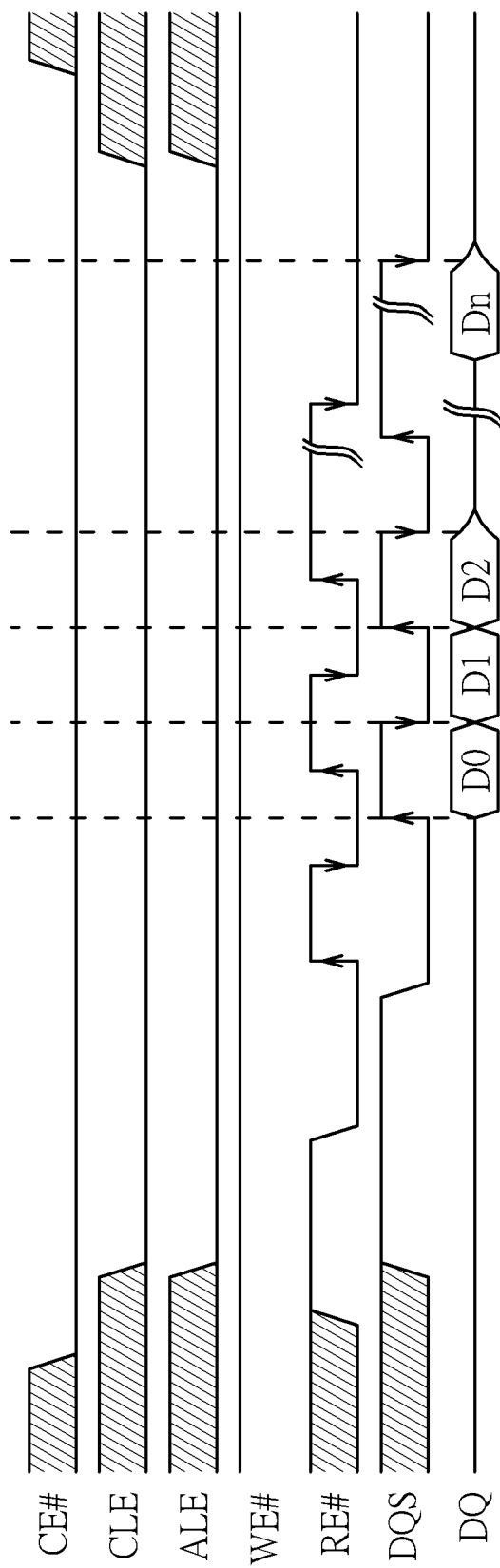
FIG. 8B shows the signal waveforms on the bus in a data output cycle according to an embodiment of the invention.

FIG. 7A, FIG. 7B, FIG. 8A and FIG. 8B show the waveforms of the signals transmitted on the bus coupled between the transmission interfaces of two controllers. FIG. 7A shows the signal waveforms in a command cycle. FIG. 7B shows the signal waveforms in an address cycle. FIG. 8A shows the signal waveforms in a data input cycle. FIG. 8B shows the signal waveforms in a data output cycle.

In FIG. 7A-FIG. 8B, the signals labeled with the hash symbol # are low active signals, and the signal segments filled with slashes indicate that their statuses are "don't care". As shown in FIG. 7A, in the command cycle, the transmission interface 520 sets the level of the command latch enable signal CLE to a high level to issue the command latch enable signal CLE as well as to indicate that the data currently transmitted on the data bus DQ is a command. The transmission interface 520 also sets the level of the write enable signal WE # to transit from a low level to a high level, thereby making the transmission interface 510 to obtain the command CMD from the data bus DQ in response to the command latch enable signal CLE and the write enable signal WE #.

As shown in FIG. 7B, in the address cycle, the transmission interface 520 sets the level of the address latch enable signal ALE to a high level to issue the address latch enable signal ALE as well as to indicate that the data currently transmitted on the data bus DQ is an address signal. The transmission interface 520 also sets the level of the write enable signal WE # to transit from a low level to a high level, thereby making the transmission interface 510 to obtain the address signal ADD from the data bus DQ in response to the address latch enable signal ALE and the write enable signal WE #.

In the data input cycle, the transmission interface 510 provides the data to the data bus DQ, and the transmission interface 520 sequentially read the data D0, D1, D2, . . . . Dn from the data bus DQ in response to the data strobe signal DQS. As shown in FIG. 8A, the transmission interface 520 may sample the data in a double data rate in response to both the rising edge and the falling edge of the data strobe signal DQS issue by the transmission interface 510. The transmission interface 520 may issue an end command after the read operation is ended. In the data input cycle, the transmission interface 520 does not control the chip enable signal CE, the command latch enable signal CLE, the address latch enable signal ALD, the read enable signal RE # and the write enable signal WE #.

In the data output cycle, the transmission interface 520 provides the data to the data bus DQ, and the transmission interface 510 sequentially read the data D0, D1, D2, . . . . Dn from the data bus DQ in response to the data strobe signal DQS. As shown in FIG. 8B, the transmission interface 510 may sample the data in a double data rate in response to both the rising edge and the falling edge of the data strobe signal DQS issue by the transmission interface 520.

According to an embodiment of the invention, depending on the content of the operation, the address signal may be transmitted using one or more clock cycles. In an embodiment of the invention, for the read operation and the write operation of the command and/or data, the transmission interface 520 may use five clock cycles to transmit the address signal, where the first four clock cycles are utilized to transmit memory address, such as the memory address of the SRAM 530, and the last clock cycle carries the information regarding an amount of transfer. For the read operation and the write operation of the feature table, the transmission interface 520 may use 1 clock cycle to transmit the address signal. In the embodiments of the invention, the feature table is stored at the transmission interface 510 to record hardware parameters, such the duty cycle of the clock signal, the length of duration of high/low level of the clock signal, or others. The address signal transmitted for the read operation and the write operation of the feature table may indicate the address in the feature table where the value of a feature is to be set to (written to) or read from.

In addition, according to an embodiment of the invention, a transfer unit of the command (e.g., the memory command) transferred by the bridge device is different from a transfer unit of the data (e.g., the written data and the read data) transferred by the bridge device. In the embodiments of the invention, the amount of transfer carried in the fifth (the last) clock cycle of the address signal indicates an amount or size of valid command (e.g., an amount of valid memory command) or an amount or size of valid data (e.g., an amount of valid written data and an amount of valid read data) in the transfer data. As an example, the transfer unit of the command transferred by the bridge device may be set to 512 bytes and the transfer unit of the data transferred by the bridge device may be set to 4 KB, and the information regarding an amount of transfer carried in the address signal may indicate how many valid 512 bytes commands or 4 KB data are in the subsequent transfer data.

According to an embodiment of the invention, the write operation in the program mode may further distinguish between the write operation of a command (e.g., the memory command) and the write operation of data (e.g., the memory data). As described above, the value of a command (e.g., the first command, which may be the command defined by Open NAND Flash Interface (ONFI)) issued by the transmission interface 520 to the transmission interface 510 may be optionally set to a first value (e.g., 88h) or a second value (e.g., 80h). In addition, when data transfer is ended, the transmission interface 520 may further issue another command to the transmission interface 510 with the value being set to a predetermined value (e.g., 10h) to indicate the end of data input.

Therefore, in an embodiment of the invention, to implement a write operation of a command (e.g., the memory command), the corresponding command, data and control signal sequentially transmitted on the bus may be:

ONFI command (88h)→address signal (with a memory address carried in the clock cycles from the first clock cycle to the fourth clock cycle and a value n carried in the fifth clock cycle)→command→ONFI command (10h)

In this example, the amount of valid command in the aforementioned command portion of the transfer data is n*512 B.

In an embodiment of the invention, to implement a write operation of data (e.g., the memory data), the corresponding command, data and control signal sequentially transmitted on the bus may be:

ONFI command (80h)→address signal (with a memory address carried in the clock cycles from the first clock cycle to the fourth clock cycle and a value n carried in the fifth clock cycle)→data→ONFI command (10h)

In this example, the amount of valid data in the aforementioned data portion of the transfer data is n*4 KB. As an example, the subsequent n transfer data chunks comprise (valid) data that has to be transferred.

Similarly, according to an embodiment of the invention, the write operation in the read mode may further distinguish between the read operation of a command (e.g., the memory command) and the read operation of data (e.g., the memory data). As described above, the value of a command (e.g., the second command, which may be the command defined by ONFI) issued by the transmission interface 520 to the transmission interface 510 may be optionally set to a third value (e.g., 08h) or a fourth value (e.g., 00h). In addition, after issuing the address signal, the transmission interface 520 may further issue another command to the transmission interface 510 with the value being set to another predetermined value (e.g., 30h) to indicate the end of operation at the transmission interface. Then, the transmission interface 510 is configured to output the transfer data.

Therefore, in an embodiment of the invention, to implement a read operation of a command (e.g., the memory command), the corresponding command, data and control signal sequentially transmitted on the bus may be:

ONFI command (08h)→address signal (with a memory address carried in the clock cycles from the first clock cycle to the fourth clock cycle and a value n carried in the fifth clock cycle)→ONFI command (30h)→command In this example, the amount of valid command in the aforementioned command portion of the transfer data is n*512 B.

In an embodiment of the invention, to implement a read operation of data (e.g., the memory data), the corresponding command, data and control signal sequentially transmitted on the bus may be:

ONFI command (00h)→address signal (with a memory address carried in the clock cycles from the first clock cycle to the fourth clock cycle and a value n carried in the fifth clock cycle)→ONFI command (30h)→data In this example, the amount of valid data in the aforementioned data portion of the transfer data is n*4 KB. As an example, the subsequent n transfer data chunks comprise (valid) data that has to be transferred.

In addition, for a write operation with respect to the feature table (an operation of setting value in the feature table), the value of a command (which may be the ONFI command) issued by the transmission interface 520 to the transmission interface 510 may be set to a value such as EFh, while for a read operation with respect to feature table (an operation of obtaining value from the feature table), the value of a command (which may be the ONFI command) issued by the transmission interface 520 to the transmission interface 510 may be set to another value such as EEh.

Therefore, in an embodiment of the invention, to implement a write (setting value)/read (obtaining value) operation of the feature table, the corresponding command, data and control signal sequentially transmitted on the bus may be:

ONFI command (EFh/EFh)→address signal (only one clock cycle)→the value corresponding to a feature to be set or obtained According to an embodiment of the invention, the value of the corresponding feature indicated in the address signal to be set and the value obtained from a field of the feature table corresponding to the feature indicated in the address signal may comprise a plurality of bits. As an example, in an embodiment of the invention, the value may comprise 4 bits.

According to an embodiment of the invention, the transmission interfaces in the bridge device and coupled to two controllers may generate the transfer data chunks in compliance with a common bridge transfer format, where the transfer data chunks carry the command and data to be transferred between the host device and the data storage device as described above.

Figure 9:
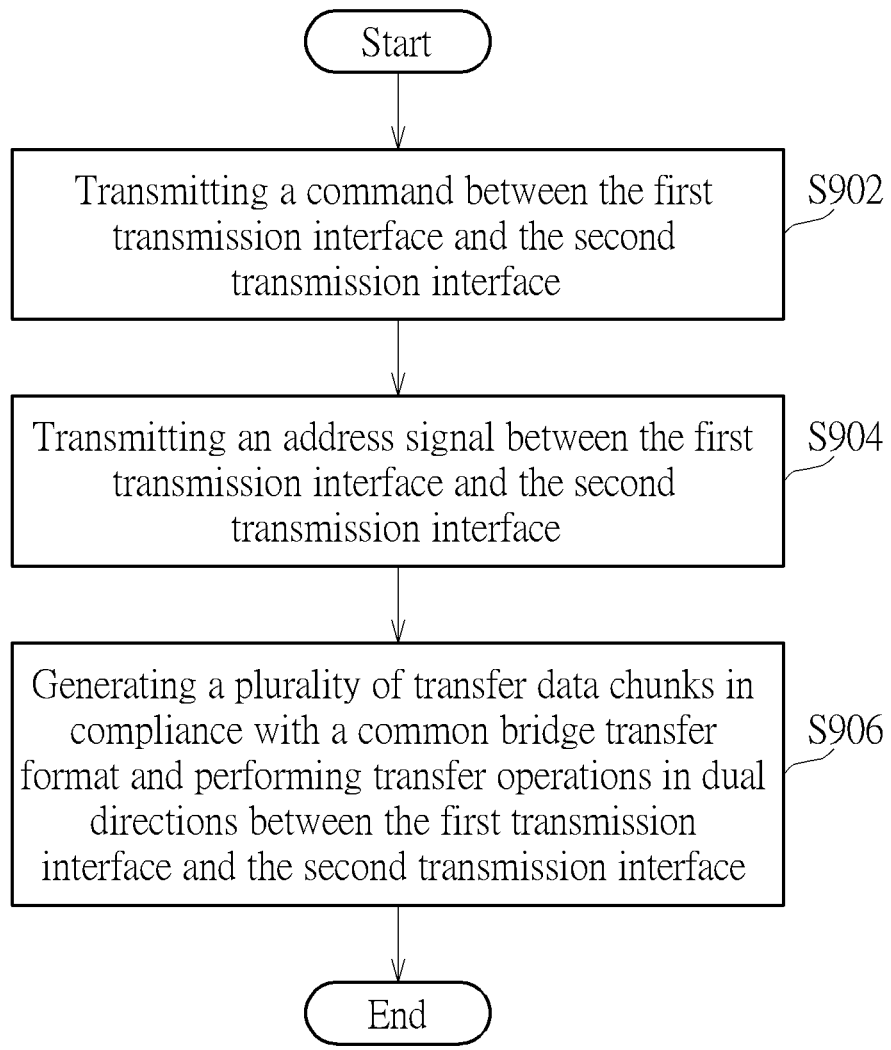
FIG. 9 shows an exemplary flow chart of a method for transferring commands and data between a host device and a data storage device to perform transfer operations in dual directions according to an embodiment of the invention.

FIG. 9 shows an exemplary flow chart of a method for transferring commands and data between a host device and a data storage device through a bridge device to perform and/or implement transfer operations in dual directions according to an embodiment of the invention. For the consistency of description, the naming of the devices utilized in the aforementioned embodiments are also applied herein, and the method comprises the following steps:

Step S902: transmitting a command between the first transmission interface and the second transmission interface.

Step S904: transmitting an address signal between the first transmission interface and the second transmission interface.

Step S906: generating a plurality of transfer data chunks in compliance with a common bridge transfer format and performing transfer operations in dual directions between the first transmission interface and the second transmission interface.

Figure 10:
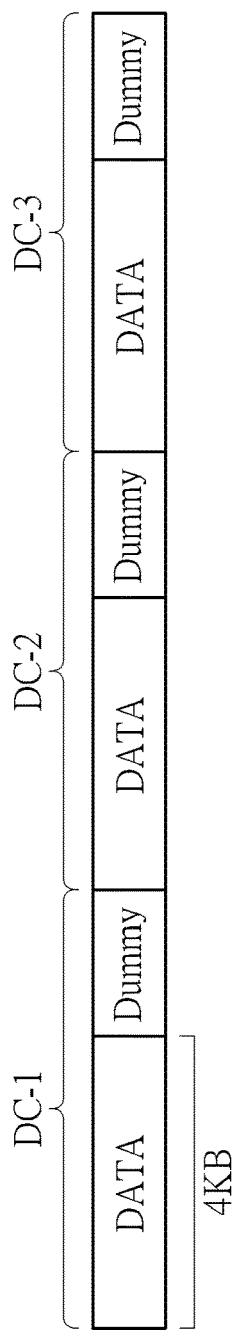
FIG. 10 is a schematic diagram showing the proposed common bridge transfer format according to an embodiment of the invention.

FIG. 10 is a schematic diagram showing the proposed common bridge transfer format according to an embodiment of the invention. In FIG. 10, a plurality of transfer data chunks, such as the transfer data chunks DC-1, DC-2 and DC-3, having the common bridge transfer format are shown. Each common bridge transfer format comprises a data portion DATA and a dummy portion Dummy. The data portion DATA is configured to carry the command or data to be transferred between the host device and the data storage device, and the data portions of the plurality of transfer data chunks have a fixed size, such as the size of 4 KB shown in FIG. 10. Therefore, in the embodiments of the invention, a portion of the transfer data chunks are utilized to transfer commands between the host device and the data storage device, and a portion of the transfer data chunks are utilized to transfer data between the host device and the data storage device. The dummy portion Dummy may carry additional information, as an example but not limited to, the Low-density parity-check code (LDPC) generated according to the content in the data portion DATA, the parity check bits, ECC data, or others.

As described above, since the transfer units of the command and data are different and in the embodiments of the invention, the command and data to be transferred through the bridge device will both be carried in the data portion DATA of the transfer data chunks, the ways to package command and data are different.

In the embodiments of the invention, the transfer unit of the data to be transferred through the bridge device may be set equal to the size of the data portion DATA, such as the size of 4 KB shown in FIG. 10. Therefore, the transmission interface 510/520 may put each piece of 4 KB data that needs to be transferred through the bridge device into the data portion DATA of a transfer data chunk, and use the information regarding an amount of transfer carried in the fifth clock cycle of the address signal to indicate the amount of data transfer, that is, the aforementioned amount of valid data (such as the valid written data and/or valid read data). For example, for the operation of data transfer, the information regarding an amount of transfer carried in the address signal may indicate how many transfer data chunks in the subsequent transfer data are packaged with the data to be transferred.

Figure 11:
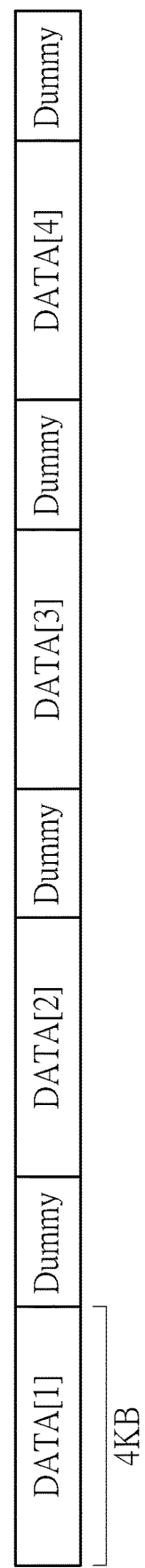
FIG. 11 is a schematic diagram showing four exemplary transfer data chunks carrying four pieces of data according to an embodiment of the invention.

FIG. 11 is a schematic diagram showing four exemplary transfer data chunks carrying four pieces of data according to an embodiment of the invention. The data DATA[1], DATA[2], DATA[3] and DATA[4] shown in FIG. 11 are the four pieces of data carried in the data portion of the transfer data chunks. According to an embodiment of the invention, the piece of data carried in the data portion of a transfer data chunk may be a data packet.

Regarding the transfer operation in the first direction, the data or data packet carried in the data portion of a transfer data chunk is the data provided by the transmission interface 520 to the transmission interface 510 and to be further transferred to the data storage device through the transmission interface 510. Therefore, after receiving the transfer data chunk, the transmission interface 510 provides the data or the data packet carried therein to the data storage device. Regarding the transfer operation in the second direction, the data or data packet carried in the data portion of a transfer data chunk is the data provided by the transmission interface 510 to the transmission interface 520 and to be further transferred to the host device through the transmission interface 520. Therefore, after receiving the transfer data chunk, the transmission interface 520 provides the data or the data packet carried therein to the host device.

For the command to be transferred, since the transfer unit, such as the aforementioned 512 bytes, of a command to be transferred through the bridge device is smaller than the size of the data portion DATA of a transfer data chunk, the transmission interface 510/520 may put multiple commands to be transferred through the bridge device in the data portion DATA of a transfer data chunk, and carries the information regarding the amount of transfer indicating the amount of valid commands (i.e., the amount of size of valid memory commands) to be transferred in the fifth clock cycle of the address signal.

Figure 12:
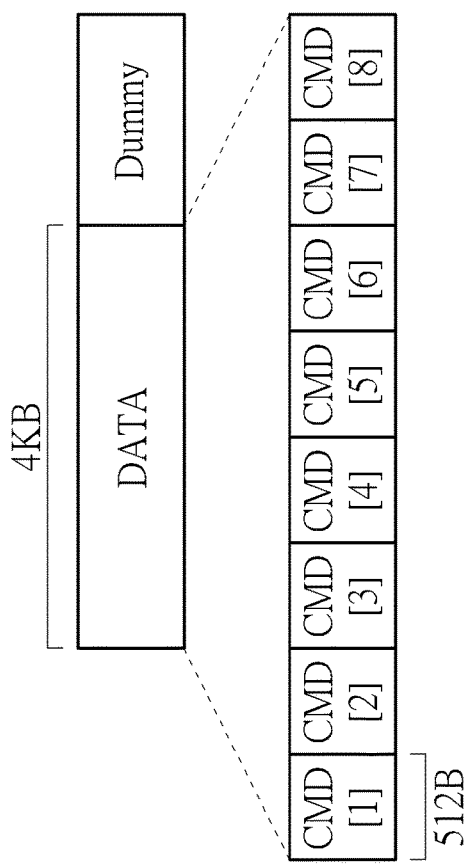
FIG. 12 is a schematic diagram showing an exemplary transfer data chunk carrying eight commands according to an embodiment of the invention.

FIG. 12 is a schematic diagram showing an exemplary transfer data chunk carrying eight commands according to an embodiment of the invention. The commands CMD [1], CMD [2], CMD [3], CMD [4], CMD [5], CMD [6], CMD [7] and CMD [8] shown in FIG. 12 are the eight commands carried in the data portion of the same transfer data chunk, wherein at least one of them is valid.

According to an embodiment of the invention, the plurality of commands carried in the data portion of a transfer data chunk may be a plurality of command packets, and each command packet is a combination of a bridge command and a memory command. In the transfer operation in the first direction, the bridge command is the command provided by the transmission interface 520 to the transmission interface 510 and the memory command is a command to be further transferred to the data storage device through the transmission interface 510. That is, the portion of memory command packaged in the command packet is command actually has to be provided to the data storage device to access the memory device. Upon receiving the transfer data chunk, the transmission interface 510 may parse the bridge command to obtain the content of the instruction instructed by the transmission interface 520 and to obtain the memory command. The transmission interface 510 may then provide the memory command to the data storage device.

In the transfer operation in the second direction, the bridge command is the command provided by the transmission interface 510 to the transmission interface 520 and the memory command is a command to be further transferred to the host device through the transmission interface 520. That is, the portion of memory command packaged in the command packet is the command, such as the aforementioned response command, actually has to be provided to the host device. Upon receiving the transfer data chunk, the transmission interface 520 may parse the bridge command to obtain the content of the instruction instructed by the transmission interface 510 and to obtain the memory command. The transmission interface 520 may then provide the memory command to the host device.

Figure 13:
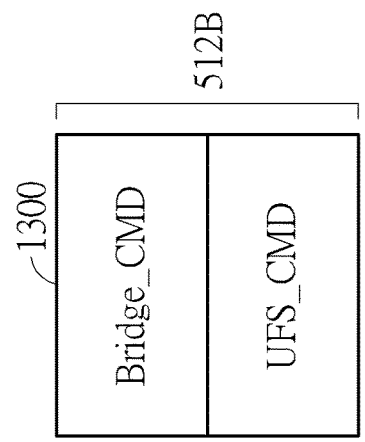
FIG. 13 is a schematic diagram of a command packet according to an embodiment of the invention.

FIG. 13 is a schematic diagram of a command packet according to an embodiment of the invention. As shown in FIG. 13, the command packet 1300 may comprise a bridge command Bridge_CMD and a memory command UFS_CMD. In an embodiment of the invention, the first 256 bytes of the command packet may carry the bridge command Bridge_CMD and the last 256 bytes of the command packet may carry the memory command UFS_CMD.

It is to be noted that in the embodiments of the invention, both the transmission interface 510 and the transmission interface 520 is capable of generating the transfer data chunks in compliance with the common bridge transfer format. For example, in the aforementioned transfer operation in the first direction, the transmission interface 520 generates the transfer data chunks in compliance with the common bridge transfer format, while in the aforementioned transfer operation in the second direction, the transmission interface 510 generates the transfer data chunks in compliance with the common bridge transfer format.

When generating a transfer data chunk carrying one or more commands to be transferred between the host device and the data storage device, the transmission interface 510/520 packages the bridge commands and the memory commands in the data portion DATA of a transfer data chunk and generate the content to be carried in the dummy portion Dummy of the transfer data chunk according to the content carried in the data portion DATA, and provides the transfer data chunk to be transferred to the transmission interface 520/510 through the bus.

In the embodiments of the invention, the bridge device formed by the memory controllers connected to each other in a symmetric manner to integrate or combine high-speed transmission interfaces made by different processes or in compliance with different standards is proposed to solve the problem of in the prior art. In addition, in the embodiments of the invention, instead of directly connecting the controller to a memory device (such as a NAND flash memory), the memory interfaces, which are originally configured to be connected to the memory interface of the corresponding memory device, in the first controller and the second controller comprised in the bridge device may be connected to each other symmetrically through the corresponding bus. In this manner, not only the cost of manufacturing the bridge device is saved, but also there is no need to additionally develop the corresponding bridge devices for different applications.

In addition, a method for transferring command and data inside of the bridge device is also proposed, to assist a host device to access a data storage device by transferring the command and data between the memory controllers integrated inside of the bridge device. In this manner, the efficient access operations of the memory device in the data storage device having high-speed transmission interfaces made by different processes or in compliance with different standards can be realized by using the proposed bridge device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bridge device, for bridging a host device and a data storage device, comprising:

a first controller, comprising a first transmission interface; and a second controller, coupled to the first controller and comprising a second transmission interface coupled to the first transmission interface through a bus, wherein the first transmission interface operates in a slave mode and the second transmission interface operates in a master mode, the first transmission interface and the second transmission interface generate a plurality of transfer data chunks in compliance with a common bridge transfer format to perform transfer operations in dual directions for respectively transferring a command and data between the host device and the data storage device, wherein the plurality of transfer data chunks comprise a first transfer data chunk, the first transfer data chunk is utilized to transfer the command between the host device and the data storage device, a data portion of the first transfer data chunk comprises a plurality of command packets and each command packet is a combination of a bridge command and a memory command, and wherein the bridge command is transferred only between the first transmission interface and the second transmission interface, and the memory command is transferred between the host device and the data storage device through the first transmission interface and the second transmission interface.

2. The bridge device of claim 1, wherein the first controller and the second controller are both a memory controller and the first transmission interface and the second transmission interface are both a flash memory interface.

3. The bridge device of claim 1, wherein the plurality of transfer data chunks further comprise a second transfer data chunk, the second transfer data chunk is configured to transfer the data between the host device and the data storage device, and a transfer unit of the command is different from a transfer unit of the data.

4. The bridge device of claim 3, wherein a data portion of the second transfer data chunk comprises a data packet, and the second transmission interface further issues an address signal to indicate an amount of valid data packets.

5. The bridge device of claim 1, wherein the second transmission interface further issues an address signal to indicate an amount of valid command packets in the first transfer data chunk.

6. The bridge device of claim 1, wherein in response to a reception of the first transfer data chunk, the first transmission interface parses the bridge command and provides the memory command to the data storage device.

7. The bridge device of claim 1, wherein in response to a transmission of the first transfer data chunk, the first transmission interface packages the bridge command and the memory command in the data portion of the first transfer data chunk and provides the first transfer data chunk to the second transmission interface.

8. A method for transferring commands and data between a host device and a data storage device to perform transfer operations in dual directions, comprising:

transferring a plurality of transfer data chunks generated in compliance with a common bridge transfer format between a first transmission interface and a second transmission interface, wherein the first transmission interface is a transmission interface of a first memory controller, the second transmission interface is a transmission interface of a second memory controller, the first transmission interface operates in a slave mode and the second transmission interface operates in a master mode, and wherein step of transferring the plurality of transfer data chunks generated in compliance with the common bridge transfer format between the first transmission interface and the second transmission interface further comprises:

receiving, by the first transmission interface, a first transfer data chunk from the second transmission interface, wherein a data portion of the first transfer data chunk comprises a plurality of command packets and one of the plurality of command packets is a combination of a first bridge command and a first memory command, wherein the first bridge command is transferred only between the first transmission interface and the second transmission interface, and the first memory command is transferred between the host device and the data storage device through the first transmission interface and the second transmission interface;

parsing, by the first transmission interface, the first bridge command to obtain the first memory command; and providing, by the first transmission interface, the first memory command to the data storage device.

9. The method of claim 8, wherein the plurality of transfer data chunks are utilized to respectively transfer a command and data between the host device and the data storage device, and a transfer unit of the command is different from a transfer unit of the data.

10. The method of claim 9, wherein the plurality of transfer data chunks generated in compliance with the common bridge transfer format comprise the data portion and a dummy portion, the data portion of each transfer data chunk carries one of the command and the data to be transferred between the host device and the data storage device, and the data portions of the plurality of transfer data chunks have a fixed size.

11. The method of claim 8, further comprising:

receiving, by the first transmission interface, an address signal from the second transmission interface, wherein the address signal indicate an amount of valid command packets in the first transfer data chunk.

12. The method of claim 8, wherein step of transferring the plurality of transfer data chunks generated in compliance with the common bridge transfer format between the first transmission interface and the second transmission interface further comprises:

receiving, by the first transmission interface, a second transfer data chunk from the second transmission interface, wherein a data portion of the second transfer data chunk comprises a data packet; and providing, by the first transmission interface, the data packet to the data storage device.

13. The method of claim 12, further comprising:

receiving, by the first transmission interface, an address signal from the second transmission interface, wherein the address signal to indicate an amount of valid data packets.

14. The method of claim 8, wherein step of transferring the plurality of transfer data chunks generated in compliance with the common bridge transfer format between the first transmission interface and the second transmission interface further comprises:

packaging, by the first transmission interface, a second bridge command and a second memory command in a data portion of a second transfer data chunk; and providing the second transfer data chunk to the second transmission interface.

\* \* \* \* \*